United States Patent
Charlton et al.

[15] 3,707,637
[45] Dec. 26, 1972

[54] DYNAMOELECTRIC MACHINE WITH LINT GUARD FOR TERMINALS

[72] Inventors: Thomas Charlton; Kenneth L. Cation, both of Lima, Ohio

[73] Assignee: Westinghouse Electric Corporation, Pittsburgh, Pa.

[22] Filed: April 28, 1971

[21] Appl. No.: 138,144

[52] U.S. Cl. ................................................. 310/71
[51] Int. Cl. ........................................... H02k 11/00
[58] Field of Search .......... 310/71, 66, 68, 89, 91, 85, 310/87, 88, 254

[56] References Cited

UNITED STATES PATENTS

| | | | |
|---|---|---|---|
| 3,527,972 | 9/1970 | Franz | 310/71 |
| 3,482,128 | 12/1969 | Keck | 310/71 |
| 2,465,042 | 3/1949 | Schlenker | 310/89 |
| 2,688,103 | 8/1954 | Scheldon | 310/254 |
| 3,514,649 | 5/1970 | Nomura | 310/68 |

Primary Examiner—J. D. Miller
Assistant Examiner—R. Skudy
Attorney—A. T. Stratton, F. P. Lyle and Gordon H. Telfer

[57] ABSTRACT

A lint guard is provided that prevents dust and lint from entering a motor in such a quantity that a fire hazard may be created and yet the lint guard does not require an assembly operation after the complete wiring of the motor. The lint guard is a generally cup-like member that fits in the conduit box opening of the motor end bell with one or more openings to accommodate terminals extending from a terminal board mounted on the end bell. The lint guard is preferably molded from a fire retardant plastic material.

5 Claims, 6 Drawing Figures

DYNAMOELECTRIC MACHINE WITH LINT GUARD FOR TERMINALS

BACKGROUND OF THE INVENTION

1. Field of the Invention

This invention relates to dynamoelectric machines with a terminal enclosure arrangement that permits lint free operation and speed of assembly.

2. State of the Art

In copending application Ser. No. 100,682, filed Dec. 22, 1970 by R. F. Fricke and assigned to the present assignee there is disclosed a dynamoelectric machine, particularly useful in laundry dryers, that has one or both ends closed for lint free operation. At least the front end at which the motor switch and terminals are located is closed in such machines. In accordance with the exemplary embodiments of the copending application those elements were provided on an insulating board mounted to the motor end bell with wiring to the outside required to be completed before a conduit box cover could be secured over the conduit box opening to complete the enclosure. While highly effective for its purposes of insuring freedom from lint in at least the front end of the motor, the conduit box cover assembly and wiring requirements have been found undesirably time consuming and expensive.

In U.S. Pat. No. 3,304,448, Feb. 14, 1967, there is disclosed a dynamoelectric machine with a terminal arrangement mounted on the stator with terminal elements having a male quick-connect terminal portion extending through an opening in the motor end bell. This opening is closed around the terminal elements by a resilient piece of material (e.g. rubber) that is fitted between the frame at an edge of the insulating sheet that supports the terminals. Such an arrangement permits preassembly of the closure and quick wiring. Yet this arrangement has the undesirable features of requiring attachment of the switch and terminal board to the stator of the machine, providing the closure member in position by a bias force in an axial direction on the stator rather than in a single fixed position. Also, a resilient member of a material such as rubber does not readily permit exposing any portion of the terminal board to permit identification of the various terminals by the person making the external conductive attachments and rubber does not satisfy Underwriters Laboratories requirements for a fire retardant material.

SUMMARY

The invention includes a lint guard for assembly over or in the conduit box opening of the end bell of a semi-enclosed or totally enclosed motor such as is described in the above-mentioned copending application. The lint guard functions to prevent lint from entering the front end of the motor through the conduit box opening in such a quantity as would create a fire hazard inside the motor. Furthermore, the lint guard fits over male quick-connect terminal portions that extend from the conduit box opening so that the conduit box cover or lint guard does not have to be assembled after the motor wiring is connected. Straight shank female connectors may be used for the connections if desired. The lint guard may be a one-piece cup-like member with projections on the side surfaces or other features that permit snap-in assembly.

In the preferred embodiment, the motor switch and terminal arrangement is such that the conductive elements are provided on an insulating board securely fixed to the motor end bell with the male quick connect terminals extending through the board and into the conduit box opening. Identification of the various contacts may be provided directly on the insulating board of the terminal arrangement. The lint guard need not obscure these identifications because it may fit securely around the periphery where otherwise air flow would be permitted between the terminal board and the end bell and yet have one or more openings in the interior of the lint guard to permit visual access to the identification on the terminal board. A continuous lint guard may also be used if desired including one that is of a transparent material that permits the required visual identification.

In contrast to the exemplary embodiment of the above-mentioned copending application, the present invention provides an improvement in that the lint-free features are preserved while providing additional convenience in assembly. Furthermore, in contrast to the above referred to U.S. Pat. No. 3,304,448, the present invention provides a terminal closure scheme that is directly suitable for use with terminals that are securely mounted on the motor end bell rather than on the machine stator and which permit easy identification of the various terminals without requiring any markings on the lint guard itself. A molded fire retardant insulation material, such as a plastic, is preferably used for the cup-shaped lint guard.

THE DRAWING

PREFERRED EMBODIMENTS

Figure 1:
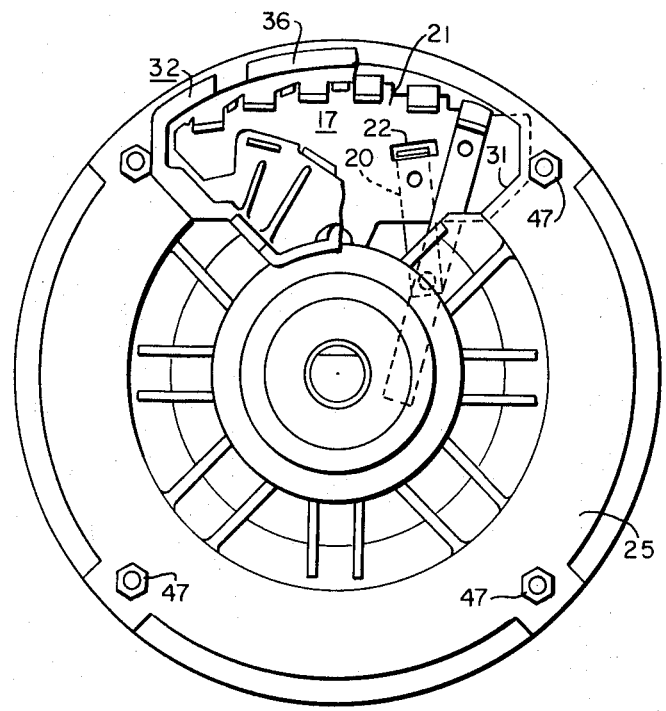
FIG. 1 is an end elevational view of a motor with a lint guard (partly broken away) in accordance with this invention.
Figure 2:
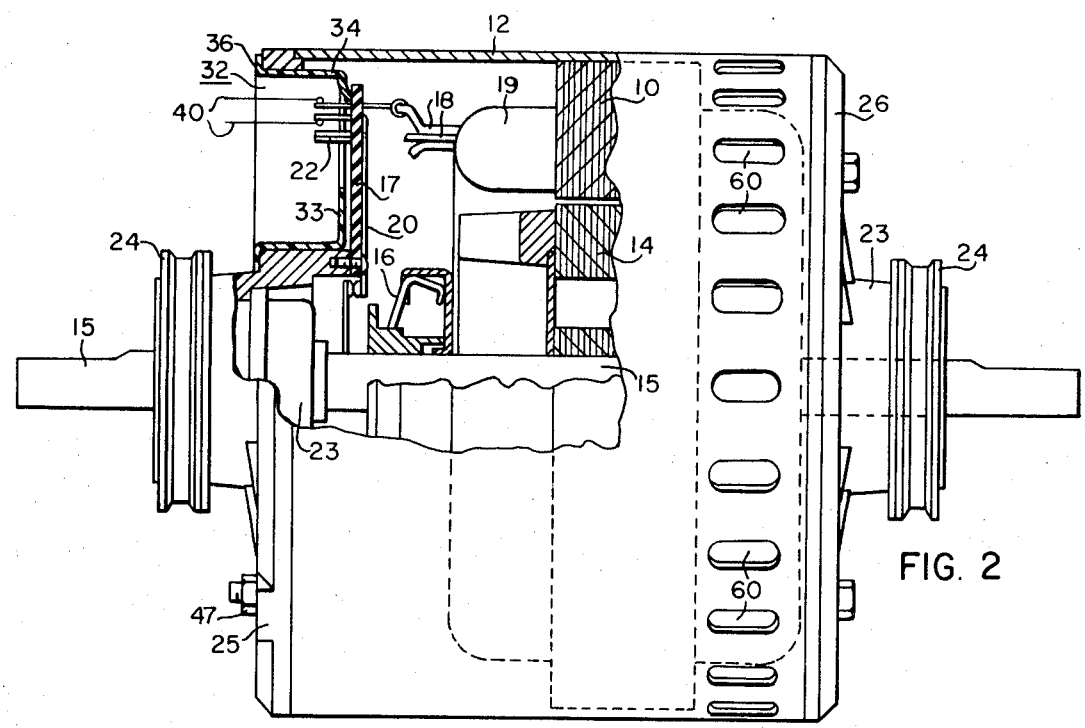
FIG. 2 is a side elevational view, partly broken away and in section, of the motor of FIG. 1 with a lint guard in accordance with the present invention.
Figure 5:
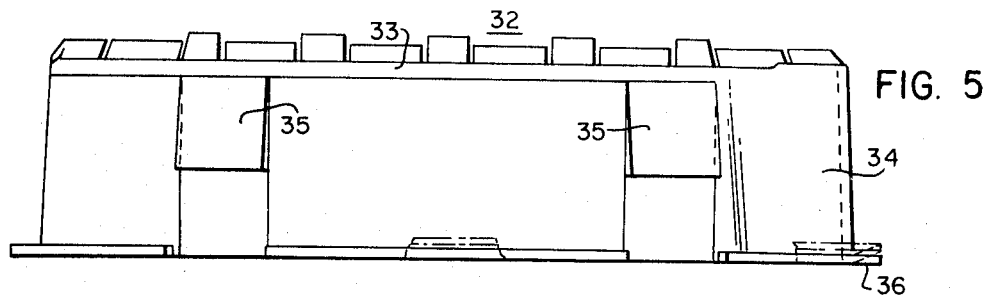
FIGS. 4 and 5 are side elevational views of the element shown in FIG. 3.

Referring to FIGS. 1 and 2, a motor with which the present invention may be practiced is illustrated. The features of the motor, except for the lint guard which will be subsequently described, may be in accordance with the teachings of the above referred to copending application. The internal parts of the motor, which may be conventional for a single phase motor, include a stator 10 attached within a generally cylindrical frame 12, a rotor 14 on a shaft 15 within the stator, a rotating governor 16 (sometimes referred to as a centrifugal switching device) on the shaft and a switch structure 17 mounted to be responsive to actuation by the governor, the switch having leads 18 connected from it to the stator windings 19. While a variety of switch and terminal structures 17 can be used, it is preferable for simplicity and economy that it be of the type having exposed conductors 20 mounted on a sheet or board 21 of an insulating material secured to the end bell 25 of the machine. The conductors 20 have straight terminal portions 22 extending through board 21 toward the exterior of the machine.

Bearing structures 23 are provided at each end of the motor on the shaft 15. Portions of the shaft extend from the motor enclosure at each end for mechanical connection with external elements. Resilient mounting rings 24 are shown for supporting the motor.

The frame 12 of the motor has joined to it at the ends end bells 25 and 26, respectively, to complete the enclosure for the internal parts. At least the end bell 25 at the end at which the switch 17 is located is a closed member except for an axial opening to accommodate the shaft 15 and bearing 23 and an opening 31 directly exposing the terminals 22 (as well as normally required openings for fasteners 47 to secure the end bell to the frame). Opening 31 is sometimes referred to herein as a conduit box opening. Ventilating openings 60 may be provided in frame 12 proximate the other end bell 60, if desired, as discussed in the copending application.

A lint guard or shield 32 is in place over the conduit box opening 31. Details of the lint guard 32 may also be seen in FIGS. 3 to 6. The lint guard 32 is preferably a single piece which may be molded from a suitable insulation material such as a phenolic type resin or a thermoplastic material such as polypropylene, polycarbonate, polysulphone, as well as others. The lint guard has a general configuration of a shallow cup having a generally flat bottom portion 33 and upstanding side portions 34 that fit within the conduit box opening. A plurality of locking projections 35 are provided on the side portions 34 to lock the lint guard in place when pressed within the opening 31 of the end bell. Alternatively, the bottom portion 33 may have apertures to receive locking projections from terminal board 21, or vice versa; in any event it is preferred to provide means to secure the lint guard without requiring the use of fasteners.

The upper edges 36 of the lint guard 32 are preferably flexible to reduce the possibility of excessive pressure on the terminal board 21 and to improve the seal so there is no appreciable air flow between the terminal board 21 and the end bell 25. The desired function of the edges 36 is readily achieved by molding the part with the edges 36 at a small angle, e.g. 20°, from the plane of the top of the sides 34. When the guard 32 is put in place and held by the locking projections 35, the edge 36 flattens out against the face of end bell 25. The bottom portion 33 of the shield 32 is provided with one or more openings arranged to accommodate the contact terminals 22 on the terminal board 21. The number of terminals 22 may, of course, be greater or less than the number shown as required by the application to which the machine is put. The solid part of the bottom portion 33 contacts the terminal board 21 and completes the lint seal.

Figure 3:
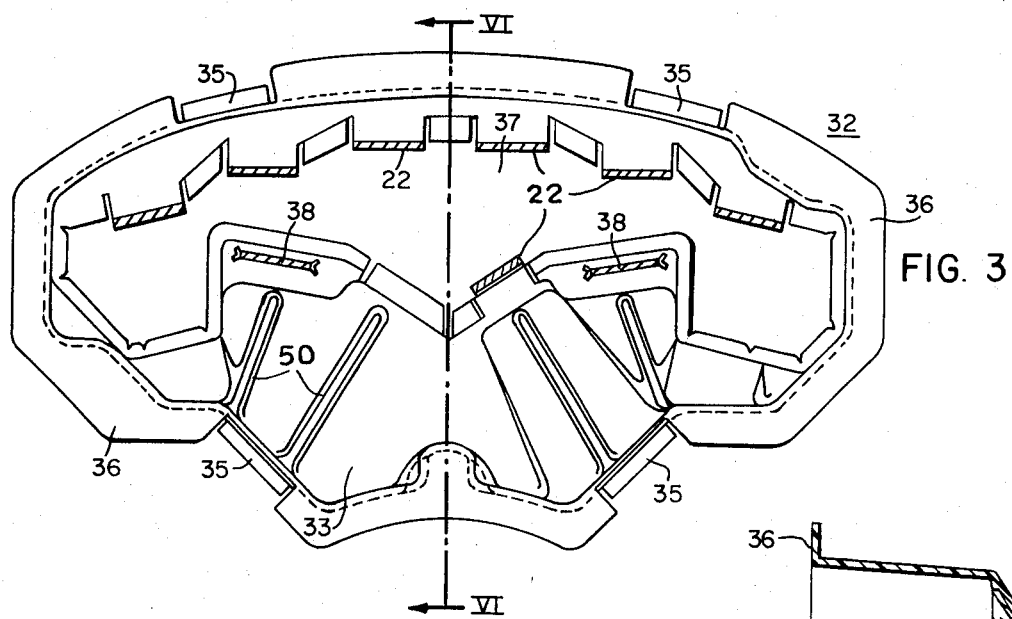
FIG. 3 is a plan view of a lint guard in accordance with the present invention.
Figure 6:
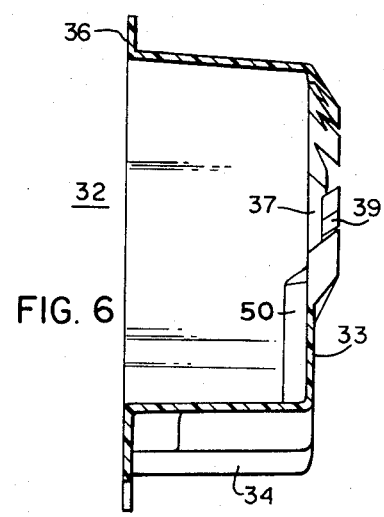
FIG. 6 is a sectional view taken along the line VI—VI of FIG. 3.
Figure 4:
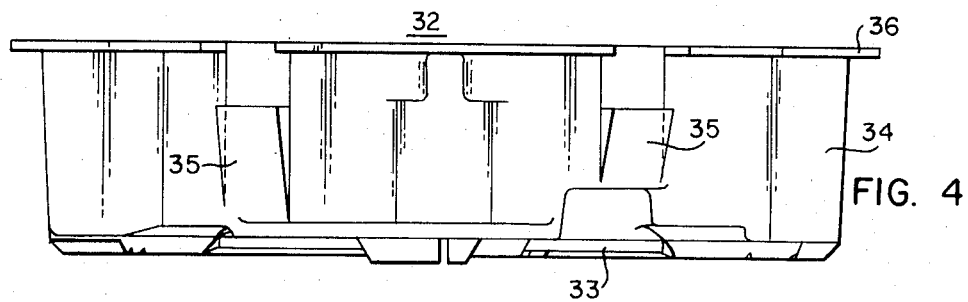

FIG. 3 shows as sectioned elements 22 the nine terminals used in a particular laundry dryer motor and their relation to portions of the lint guard. In the illustrated embodiment, the lint guard 32 has a window 37 and also a pair of slits 38 in the bottom portion 33. The slits 38 each accommodate only a single terminal 22 and provide positive location of the guard 32. The window 37, through which the remaining terminals 22 extend, leaves a portion of terminal board 21 exposed so that identifying marks on the terminal board to identify individual terminals can be readily seen. The periphery of the window 37 and slits 38 preferably have tapered tabs 39 depending at an angle from bottom portion 33 to provide a flexible edge sealing the guard 32 against the terminal board 21. If desired, an additional gasket member may be used to provide a more effective seal; however, this expedient is not considered ordinarily necessary. The bottom portion 33 may have ribs 50 of greater thickness than the major portion of the bottom to ensure the member retains the desired shape.

Among other suitable modifications are to provide the lint shield with a solid bottom portion except for slits to accommodate the terminal members themselves. To permit terminal identification, it is preferred that in such case the bottom portion be of a transparent material so that markings on the terminal board can be seen.

The lint guard 32, in any of its various forms, permits external connection of leads 40 to terminals 22 by contact elements 41 of various known types, that may be joined to leads 40 and simply slid onto the terminals 22.

What we claim is:

1. A lint guard for a dynamoelectric machine conduit box opening comprising: a member having a general configuration of a shallow cup with a generally flat bottom portion and upstanding side portions, the member being a unitary member comprising a molded insulation material; the bottom portion having one or more openings therein adapted to accommodate terminal members, the bottom portion also having flexible edges adjacent said one or more openings; said side portions having a configuration to fit within a conduit box opening in an end bell of a dynamoelectric machine, said side portions also having flexible edges, remote from the bottom portion, extending outwardly from said side portions.

2. The subject matter of claim 1 wherein: said member has means for securing said member in position in a dynamoelectric machine without requiring fasteners.

3. A dynamoelectric machine comprising: a generally cylindrical frame with an end bell secured at each end thereof; a terminal structure mounted on an inner surface of a first of said end bells, said first end bell having a conduit box opening therein facing a surface of said terminal structure from which terminal members project; a lint guard comprising a single member having a general configuration of a shallow cup with a relatively flat bottom portion and upstanding sides, the sides configured to fit within said conduit box opening, the bottom portion having one or more openings accommodating said terminal members to permit external electrical connection with said lint guard in place.

4. The subject matter of claim 3 wherein: said side portions have a flexible edge, remote from said bottom portion, extending outwardly from said side portions and bearing against an outer surface of said end bell; said side portions also have locking projections extending outwardly therefrom to secure said guard within said conduit box opening without fasteners; and said bottom portion has flexible edges adjacent said one or more openings and bearing against said surface of said terminal structure.

5. The subject matter of claim 3 wherein: said one or more openings in the bottom portion of said lint guard includes a window of dimensions to accommodate said terminal members and to expose a portion of said surface of said terminal structure to permit viewing any identifying marks thereon for the respective terminal members.

\* \* \* \* \*